(12) United States Patent
Okholm et al.

(10) Patent No.: US 7,203,169 B1
(45) Date of Patent: Apr. 10, 2007

(54) INTERFACE FACILITATING CONFIGURATION OF NETWORK RESOURCE UTILIZATION

(75) Inventors: Jon Eric Okholm, San Jose, CA (US); Eric D. Reid, San Jose, CA (US)

(73) Assignee: Packeteer, Inc., Cupertino, CA (US)

(*) Notice: Subject to any disclaimer, the term of this patent is extended or adjusted under 35 U.S.C. 154(b) by 902 days.

(21) Appl. No.: 10/027,499

(22) Filed: Dec. 20, 2001

(51) Int. Cl.
*H04L 12/26* (2006.01)
*G06F 15/16* (2006.01)

(52) U.S. Cl. ...................... 370/232; 370/252

(58) Field of Classification Search ............... 370/468, 370/229, 232–234, 252–253; 709/230, 235, 709/237
See application file for complete search history.

(56) References Cited

U.S. PATENT DOCUMENTS

| 5,396,621 | A | * | 3/1995 | MacGregor et al. ........ 715/809 |
| 5,548,722 | A | * | 8/1996 | Jalalian et al. ............... 709/220 |
| 6,094,419 | A | * | 7/2000 | Ohyoshi et al. ............. 370/231 |
| 6,141,686 | A | * | 10/2000 | Jackowski et al. ........... 709/224 |
| 6,578,077 | B1 | * | 6/2003 | Rakoshitz et al. ........... 709/224 |
| 6,816,903 | B1 | * | 11/2004 | Rakoshitz et al. ........... 709/226 |
| 7,039,577 | B1 | * | 5/2006 | Fingerhut et al. ............. 703/21 |
| 2005/0235273 | A1 | * | 10/2005 | Travison et al. ............. 717/136 |

OTHER PUBLICATIONS

Computing Resources for Residents; University Housing, University of Illinois at Urbana-Champaign; Nov. 12, 2001.*
NetFlow FlowAnalyzer Installation and User Guide Release 2.0; Cisco Systems, Inc.; copyright 1998; chapter 1 and pp. 24-27 of chapter 3; available at http://www.cisco.com/univercd/cc/td/doc/product/rtrmgmt/nfa/nfa_iug.*
NetFlow Services and Applications; White Paper; Cisco Systems, Inc; Jun. 30, 2000; available at http://web.archive.org/web/20000818231744/http://www.cisco.com/warp/public/cc/pd/iosw/ioft/neflct/tech/napps_wp.htm.*

* cited by examiner

Primary Examiner—Chau Nguyen
Assistant Examiner—Kerri M Rose
(74) Attorney, Agent, or Firm—Mark J. Spoylar

(57) ABSTRACT

Methods, apparatuses and systems facilitating the configuration of parameters controlling utilization of a network resource. In one embodiment, the present invention allows a network administrator to quickly and easily configure effective bandwidth utilization controls and observe the results of applying them. According to one embodiment, a network administrator is presented with an interface displaying the most significant traffic types with respect to a bandwidth utilization or other network statistic and allowing for the association of bandwidth utilization controls to these traffic types.

34 Claims, 5 Drawing Sheets

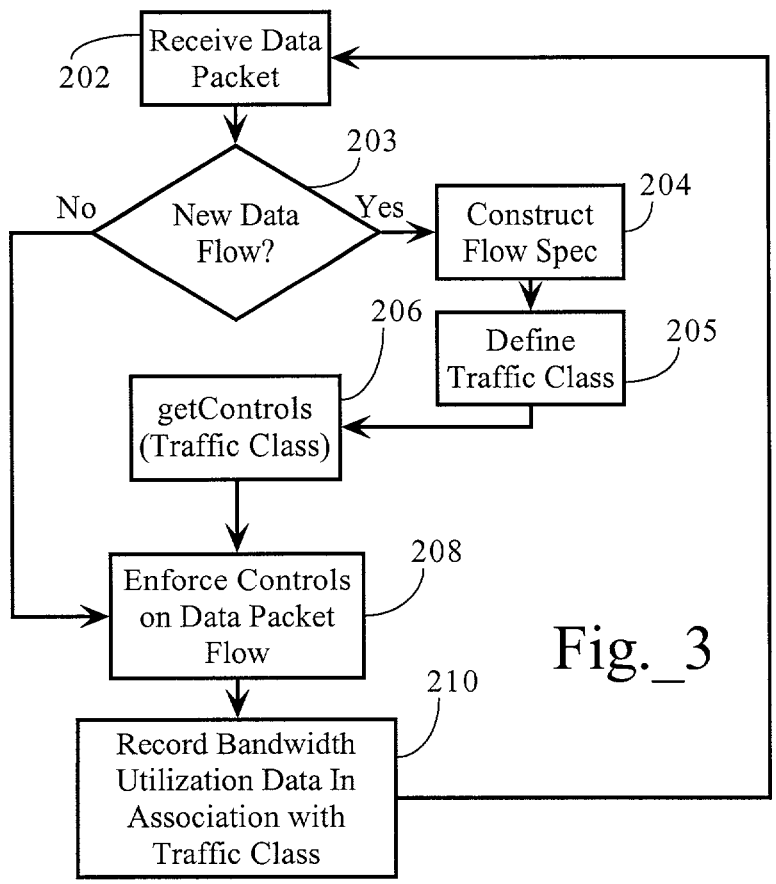
Fig._3
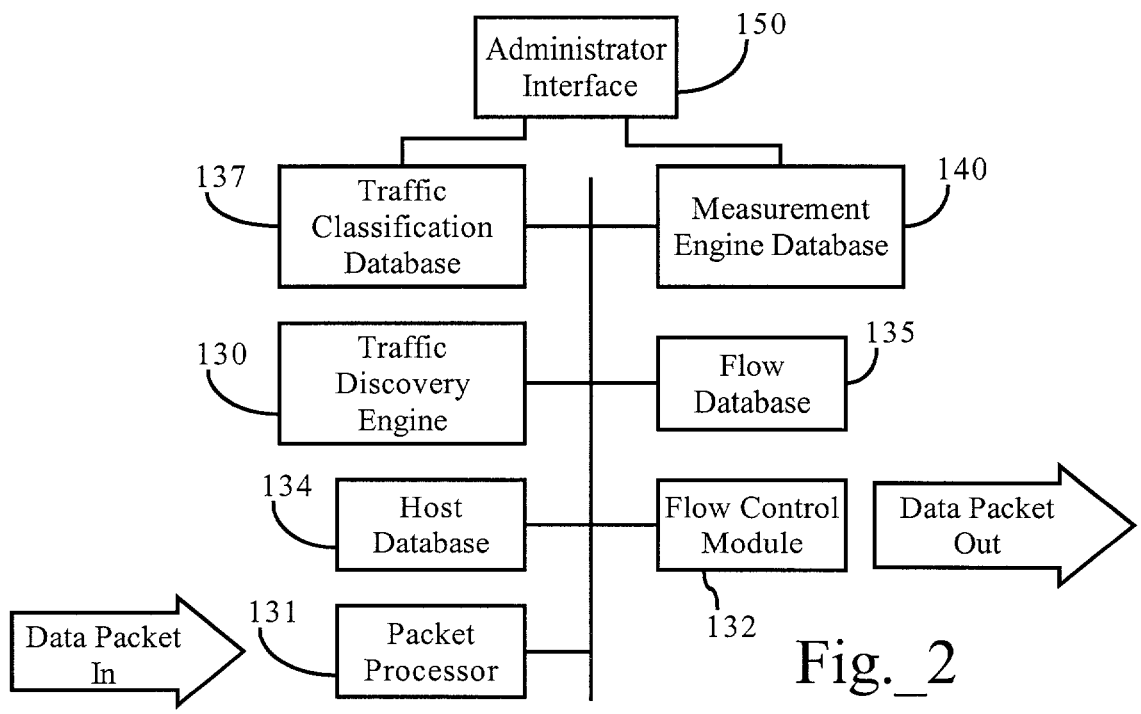
Fig._2

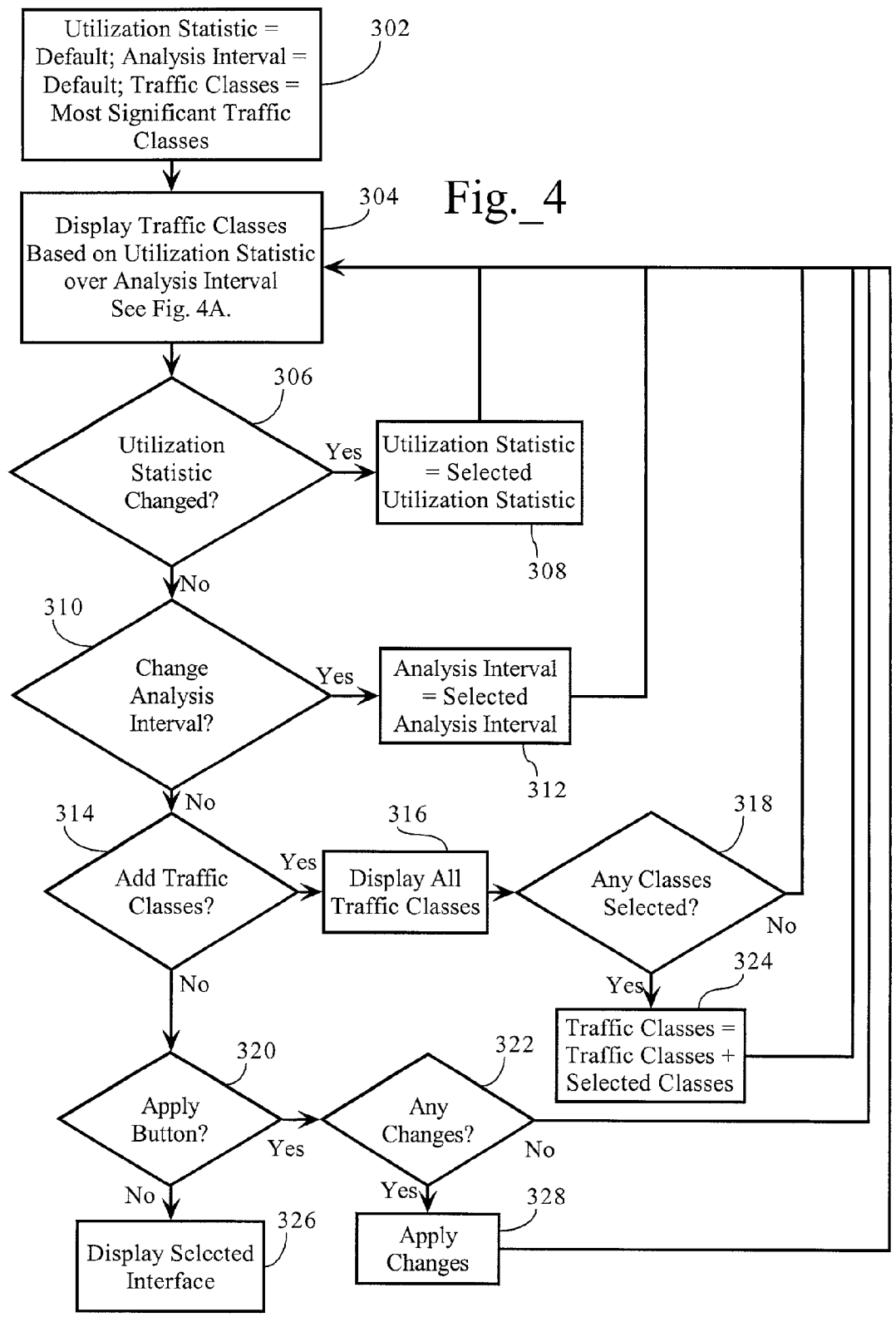
Fig._4

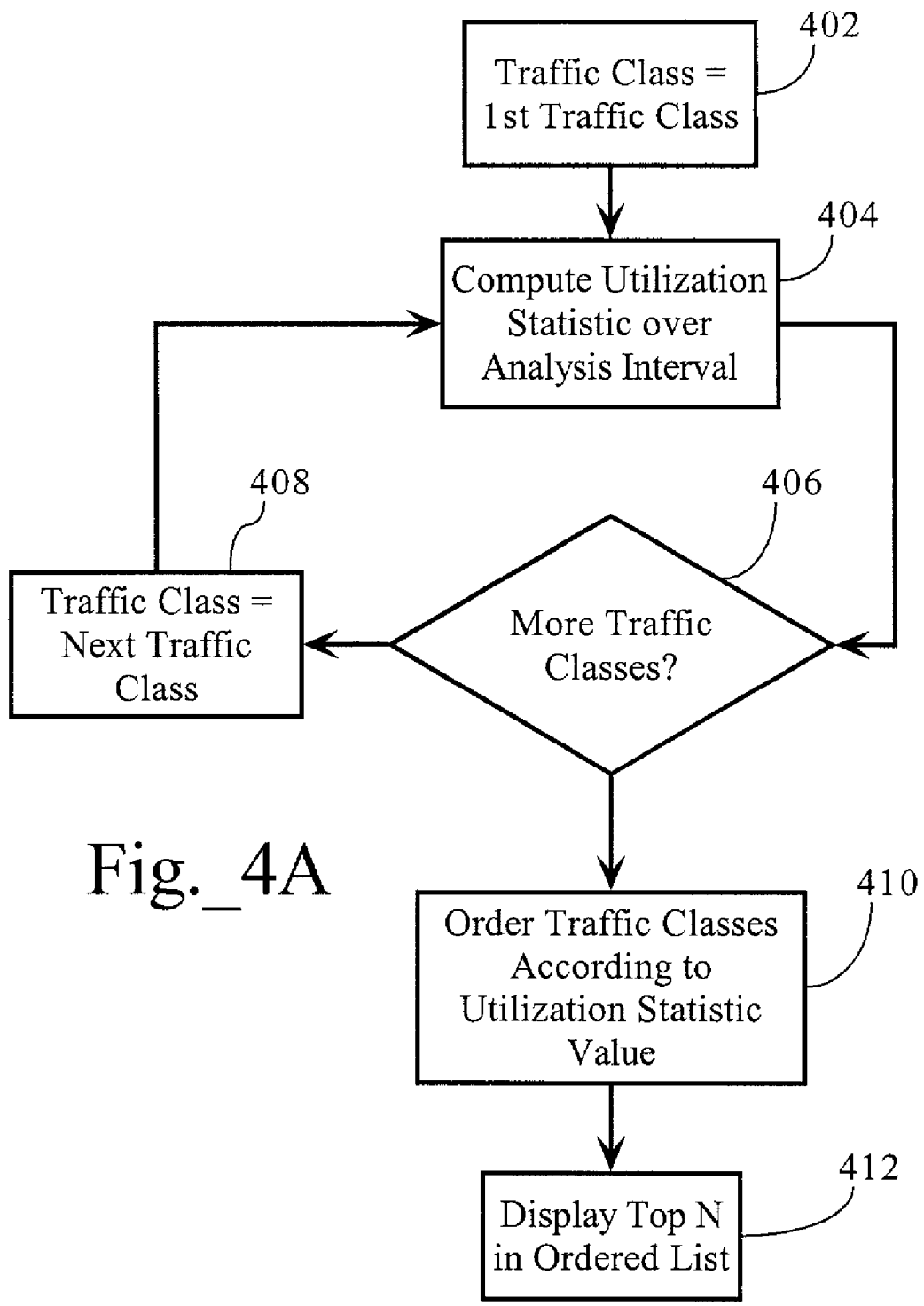
Fig._4A

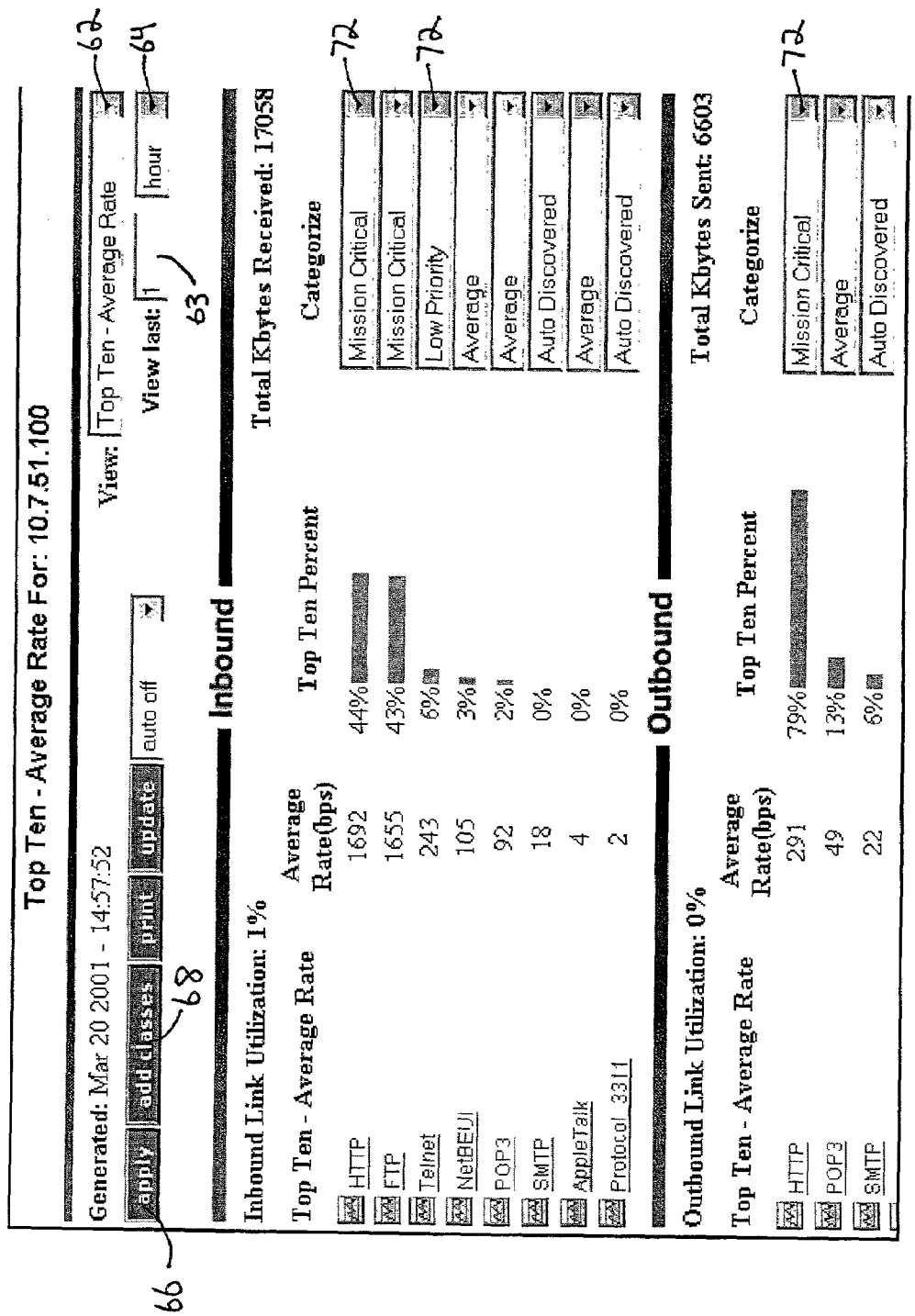
FIG._5

INTERFACE FACILITATING CONFIGURATION OF NETWORK RESOURCE UTILIZATION

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment Without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,051, in the name of Guy Riddle, entitled "Method for Automatically Determining a Traffic Policy in a Packet Communications Network;" and U.S. patent application Ser. No. 09/198,090, in the name of Guy Riddle and Robert L. Packer, entitled "Method for Automatically Classifying Traffic in a Packet Communications Network."

FIELD OF THE INVENTION

The present invention relates to configuration interfaces and, more particularly, to methods and apparatuses facilitating the configuration of parameters, such as parameters controlling utilization of network resources.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window. A component of this mechanism is sometimes referred to as "slow start."

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link they can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business functionality. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. Bandwidth management devices allow network administrators to specify policies operative to control and/or prioritize the bandwidth allocated to individual data flows according to traffic classifications. In addition, certain bandwidth management devices allow network administrators to divide available bandwidth into partitions. These partitions ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user).

Configuration of bandwidth management devices, however, can become quite complicated for large or complex networks that generate a massive number of data flows associated with a wide variety of traffic classes all competing for bandwidth. Such conditions require a network administrator to prioritize hundreds, and potentially thousands, of classes of traffic to achieve an effective bandwidth management configuration. Network administrators find this configuration process quite time consuming and prone to error. Moreover, it is often difficult to determine if a particular configuration is working effectively. Specifically, a network administrator has to identify from a large list what traffic classes use more than a desired amount of bandwidth and set policies to restrict data flows associated with such traffic classes. A network administrator also has to find important traffic classes and set policies to ensure a desired amount of bandwidth is available for such traffic classes. Indeed, a network administrator could spend a great deal of time setting up hundreds of bandwidth management policies that fail to achieve desired overall bandwidth controls.

In light of the foregoing, a need exists in the art for methods, apparatuses and systems that facilitate the configuration of parameters controlling utilization of shared or network resources. Embodiments of the present invention substantially fulfill this need.

SUMMARY OF THE INVENTION

The present invention provides methods, apparatuses and systems facilitating the configuration of parameters controlling utilization of a network resource. In one embodiment, the present invention allows a network administrator to quickly and easily configure effective bandwidth utilization controls and observe the results of applying them. According to one embodiment, a network administrator is presented with an interface displaying the most significant traffic types with respect to a bandwidth utilization or other measured network statistic and allowing for the association of bandwidth utilization controls to these traffic types.

DESCRIPTION OF THE DRAWINGS

FIG. 2 is a functional block diagram setting forth the functionality in a bandwidth management device according to an embodiment of the present invention.

FIG. 3 is a flow chart providing a method allowing for enforcement of bandwidth utilization controls on network data flows.

FIG. 4 is a flow chart setting forth a method allowing for the configuration of bandwidth utilization controls.

FIG. 4A is a flow chart diagram providing a method associated with the configuration of bandwidth utilization controls.

FIG. 5 depicts a user interface facilitating configuration of bandwidth utilization controls.

DESCRIPTION OF PREFERRED EMBODIMENT(S)

Figure 1:
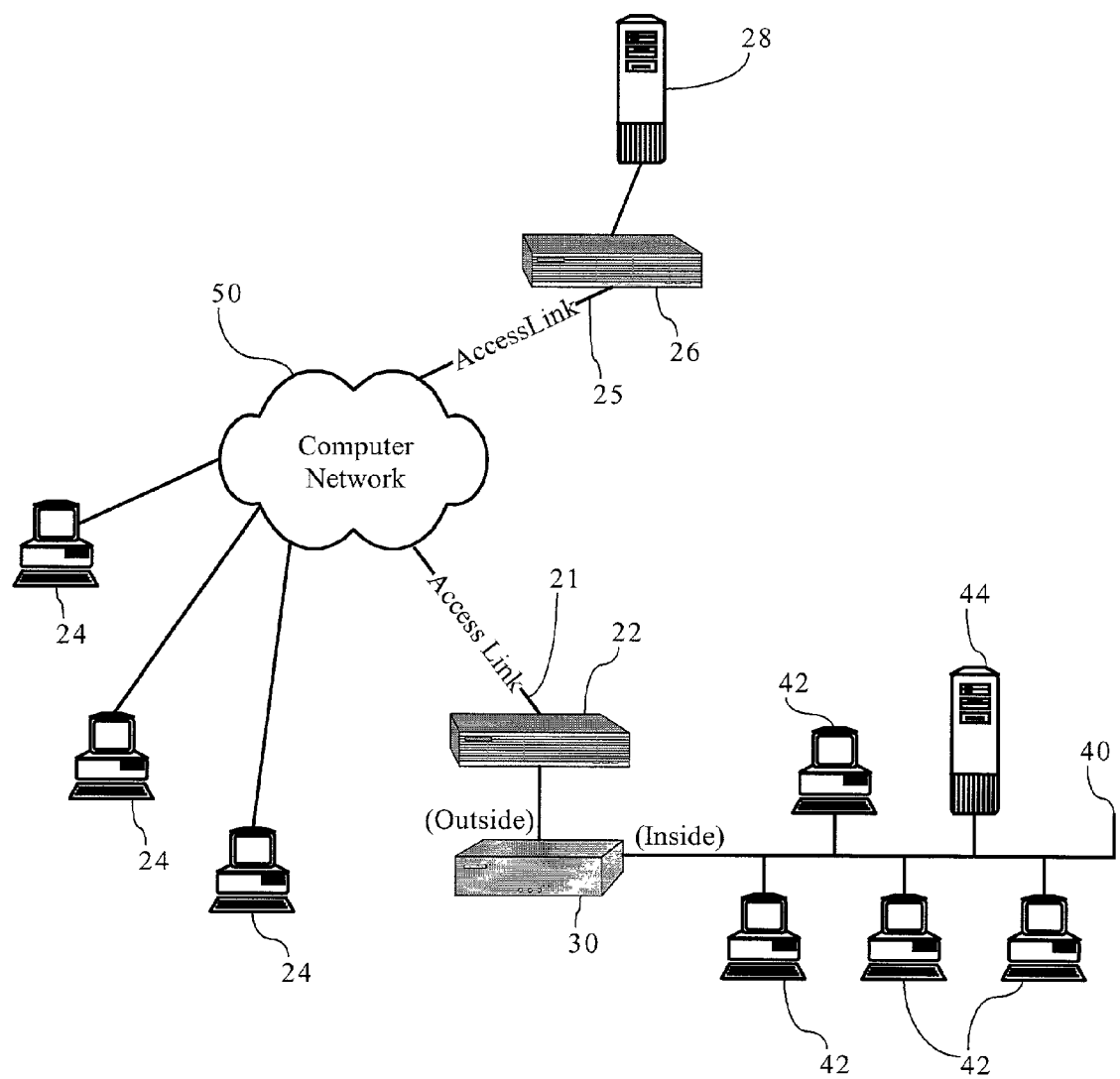
FIG. 1 is a functional block diagram illustrating a computer network environment including a bandwidth management device according to an embodiment of the present invention.

FIG. 1 sets forth a packet-based computer network environment including a bandwidth management device 30. As FIG. 1 shows, local area computer network 40 interconnects several TCP/IP end systems, including client devices 42 and server device 44, and provides access to resources operably connected to computer network 50 via router 22 and access link 21. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations. Bandwidth management device 30 is provided between router 22 and local area computer network 40. Bandwidth management device 30 is operative to classify data flows and, depending on the classification, enforce respective partitions and/or policies on the data flows to control bandwidth utilization across access link 21.

A. Bandwidth Management Device

FIG. 2 is a block diagram illustrating functionality included in bandwidth management device 30. In one embodiment, bandwidth management device 30 comprises packet processor 131, flow control module 132, measurement engine 140, traffic discovery engine 130, administrator interface 150, and traffic classification database 137. Packet processor 131 is operative to detect new data flows and construct data structures including attributes characterizing the data flow. Flow control module 132 is operative to enforce bandwidth controls on data flows traversing bandwidth management device 30. Traffic discovery engine 130 is operative to detect traffic classes associated with data flows, as discussed more fully below. In one embodiment, traffic discovery engine 130 is configured to automatically create traffic classes based on the data flows traversing bandwidth management device 30. Traffic classification database 137 stores traffic classes associated with data flows encountered during operation of bandwidth management device 30, as well as manually created traffic classes and a hierarchical traffic class structure, if any, configured by a network administrator. In one embodiment, traffic classification database 137 stores traffic classes, in association with pointers to matching rules and bandwidth utilization controls or pointers to data structures defining such bandwidth allocation controls. Measurement engine 140 monitors operation of bandwidth management device 30 to monitor bandwidth utilization across access link 21 with respect to a plurality of bandwidth utilization and other network statistics.

Administrator interface 150 facilitates the configuration of bandwidth management device 30 and allows access to report data detailing the operation of bandwidth management device 30 and bandwidth utilization and other network statistics on a per-traffic-class basis. Administrator interface 150 allows administrators to select identified traffic classes and associate them with bandwidth controls, as more fully described below. Administrator interface 150 can be a command line interface or a graphical user interface accessible, for example, through a conventional browser on client device 42.

In one embodiment, when packet processor 131 encounters a new data flow it stores the source and destination IP addresses contained in the packet headers in host database 134. Packet processor 131 further constructs a flow specification object including such attributes as pointers to the source and destination IP addresses in host database 134, as well as other flow specification parameters, such as service type, protocol type and other parameters characterizing the data flow. In one embodiment, such fields can include information gleaned from examination of data within layers 2 through 7 of the OSI reference model. U.S. Pat. No. 6,046,980, incorporated by reference herein, discloses classification of data flows for use in a packet-based communications environment. In one embodiment, packet processor 131 creates and stores a flow state record corresponding to the new data flow in flow database 135. In one embodiment, flow state record attributes include a pointer to a corresponding flow specification object, as well as other flow state parameters, such as TCP connection status.

A.1. Traffic Classification

A traffic class comprises a set of matching rules allowing for logical grouping of data flows that share the same characteristic or set of characteristics—e.g., a specific application, protocol, IP address, MAC address, port, etc. In one embodiment, each traffic class has at least one matching rule defining the criteria used for identifying a specific traffic type. In one embodiment, bandwidth management device 30 includes functionality allowing for classification of network traffic based on information from layers 2 to 7 of the OSI reference model.

Traffic classification database 137 stores traffic classes associated with data flows that traverse access link 21. Traffic classification database 137 stores the traffic classes and corresponding data (e.g., matching rules, policies, and partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth control for that traffic class, such as a partition, a policy, or a combination thereof. Administrator interface 150 also allows for the arrangement of traffic classes into a hierarchical classification tree (see above). Bandwidth management device 30 allows an administrator to manually create a traffic class by specifying a set of matching rules and, as discussed below, also automatically creates traffic classes by monitoring network traffic across access link 21 and classifying data flows according to a set of criteria to create matching rules for each traffic type.

A.2. Automatic Traffic Classification

Traffic discovery engine 130, in one embodiment, is operative to apply predefined sets of matching rules to identify a traffic class associated with data flow not included in traffic classification database 137. In one embodiment, traffic discovery engine 130 creates traffic classes automatically in response to data flows traversing bandwidth management device 30 and stores such traffic classes in traffic classification database 137. Automatic traffic classification is disclosed in application Ser. No. 09/198,090, now U.S. Pat. No. 6,412,000, which is incorporated herein by reference. In one embodiment, traffic discovery engine 130 must detect a minimum number of data flows within a predefined period for a given traffic type before it creates a traffic class in traffic classification database 137. In one embodiment, such discovered traffic classes are, by default, attached to or associated with either the "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes.

A.3. Flow Control Module

As discussed above, flow control module 132 enforces bandwidth controls on data flows traversing access link 21. A bandwidth control for a particular data flow can comprise a partition, a policy, or a combination of the two. Flow control module 132 can use any suitable functionality to enforce bandwidth controls known in the art, including, but not limited to class-based weighted fair queuing, Committed Access Rate (CAR) and "leaky bucket" techniques. Flow control module 132 may incorporate any or a subset of the TCP rate control functionality described in the cross-referenced U.S. patents set forth above for controlling the rate of data flows.

A.3.a. Partitions

A partition operates to manage bandwidth for aggregate data flows associated with a traffic class. A partition protects a network traffic class by guaranteeing a defined amount of bandwidth and/or limits a network traffic class by placing a cap on the amount of bandwidth a traffic class can consume. Partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions are arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smatter burstable child partition for the accounting department.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.3.b. Policies

Flow control module 132 is also operative to enforce bandwidth management policies on traffic across access link 21. Whereas partitions allow for control of aggregate data flows associated with a traffic class, policies allow for control of individual data flows. In one embodiment, flow control module 132 supports different policy types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class.

A.3.c. Bandwidth Control Categories

Bandwidth management device 30 also supports bandwidth control categories. In one embodiment, administrator interface module 150 allows for the selection of a traffic class and the association of a bandwidth control category to it. See FIG. 5. Bandwidth management device 30, in one embodiment, supports the following bandwidth control categories for inbound and outbound data flows separately: 1) Mission Critical, 2) Average, 3) Low Priority, 4) AutoDiscovered-Default, and 5) Prohibited. In one form, each bandwidth control category maps to a partition and/or a policy, whose parameters are configured to achieve desired bandwidth management objectives. For example, traffic classes associated with the "mission critical" category receive top priority, while data flows associated with "average" traffic classes can be restricted in order to give precedence to "mission critical" data flows. In addition, bandwidth controls for "low priority" data flows are configured such that they do not disrupt operations associated with "average" or "mission critical" data flows. Data flows associated with the "autodiscovered-default" category are data flows associated with traffic classes automatically discovered by traffic discovery engine 130 and not explicitly assigned to another bandwidth control category. Lastly, bandwidth controls associated with "prohibited" data flows are configured to block such flows.

In an exemplary configuration, the above-described bandwidth control categories are implemented by the following bandwidth control parameters. For didactic purposes, assume that the total available bandwidth across access link 21 is 10 Mbps. In one embodiment, total bandwidth, both in the outbound and inbound directions, is divided among the four bandwidth control categories discussed above, omitting the "prohibited" category. In one embodiment, partitions are associated with each bandwidth control category to divide available bandwidth across access link 21. For instance, the "mission critical" partition may be configured to guarantee a minimum rate of 5 Mbps and be burstable to 10 Mbps, the full capacity of access link 21. The "average" and "autodiscovered-default" partitions can be configured to achieve a minimum rate of 2 Mbps, respectively, and be burstable up to 10 Mbps. Lastly, the "low priority" partition can be configured to guarantee a minimum rate of 1 Mbps and be burstable up to 2 Mbps. Of course, any suitable partition parameters can be implemented. In addition, the "low priority" category is implemented, in one embodiment, with a discard policy. In one embodiment, such bandwidth control categories are further supported by policies. For example and in one embodiment, each bandwidth control category has a priority policy to determine which categories are allowed access to excess bandwidth over other categories.

A wide variety of configurations are possible. For example, bandwidth management device 30 may rely solely on either partitions or policies to achieve desired bandwidth utilization controls. In addition, bandwidth management device 30 may rely on weighted policies associated with traffic classes. Moreover, bandwidth management device 30 can be configured to implement additional or fewer bandwidth control categories. In addition, bandwidth management device 30 can be configured to implement additional partitions beyond those associated with the bandwidth control categories described above.

A.4. Measurement Engine

Measurement engine 140 samples data associated with the operation of bandwidth management device 30, including data allowing for measurement of bandwidth utilization across access link 21 with respect to a plurality of bandwidth utilization and other network statistics. For example, measurement engine 140 monitors the number of inbound and outbound packets, as well as the number of bytes, traversing bandwidth management device 30 on a traffic class level. Such data allows for the calculation over a given analysis interval of bandwidth utilization statistics, such as average rate (bps), peak rate (bps), total bytes, and network efficiency (i.e., the number of packets/flows/bytes that are not retransmitted over the total number of packets/flows/bytes). In one embodiment, measurement engine 140 periodically recalculates bandwidth utilization statistics for each traffic class and stores them in corresponding fields of traffic classification records. In one embodiment, such periodic calculations occur every minute. As discussed below, this measurement data can then be analyzed over a desired time interval (e.g., by minute, quarter-hour, hour, half-day, day, etc.) to enable effective decision-making with respect to bandwidth management configurations.

B. Operation

FIG. 3 illustrates a method facilitating the enforcement of bandwidth utilization controls on data flows transmitted across bandwidth management device 30. The method for enforcing bandwidth utilization controls, however, is not critical to the present invention; any suitable method can be employed. In one embodiment, packet processor 131 receives a data packet (FIG. 3, step 202) and determines whether it is part of a new data flow (step 203). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding flow state record. In some embodiments, packet processor 130 may have to encounter multiple packets to identify and fully characterize a new data flow (e.g., identify a traffic class, etc.). For example, U.S. Pat. No. 6,046,980 issued to Packer, identified above, discloses methods for classifying packet network flows.

If the packet is a new data flow, packet processor 131 creates a flow state record for the new data flow in flow database 135 (step 204). In one embodiment, packet processor 131 analyzes the source and destination IP addresses in the packet header and scans host database 134 for matching entries. If no matching entries exist, packet processor 131 creates new entries for the source and destination IP addresses. As discussed above, packet processor 131 constructs a flow specification object including attributes characterizing the data flow, including pointers to the source and destination IP address entries in host database 134. Other flow specification attributes can include port number, service type, protocol, etc. In addition, if the packet represents a change to the data flow, packet processor 131 changes attributes of the flow state record and/or flow specification object as appropriate.

Traffic classification database 137 operates on attributes of the flow state record and/or flow specification object to identify an existing traffic class (step 205). If no existing traffic class is found, traffic discovery engine is invoked to detect a traffic type associated with the data flow and automatically create an additional traffic class traffic classification database 137. Such discovered traffic classes are attached to the "auto-discovered" bandwidth control category discussed above. Rate control module 132 then accesses traffic classification database 137 to retrieve the bandwidth utilization controls associated with the traffic class (step 206) and enforces the bandwidth utilization controls on the data packet flow (step 208). In addition, measurement engine 140 records data associated with the packet (step 210) to allow for analysis of bandwidth utilization on a traffic class level.

FIG. 5 illustrates a graphical user interface, according to an embodiment of the present invention, facilitating the configuration of bandwidth utilization controls. When an administrator, at client node 42 for example, logs into bandwidth management device 30 and authenticates himself, administrator interface 150 transmits graphical user interface (illustrated in FIG. 5) to client node 42. Upon selection of the configuration interface, administrator interface module 150 transmits graphical user interface comprising various interface controls such as "apply" button 66, "add classes" button 68, pull-down menu 62, analysis interval field 63, and pull-down menu 64. Still further, for both outbound and inbound flows, graphical user interface displays the most significant traffic classes relative to the current utilization statistic as computed over a selected analysis interval. As FIG. 5 shows, graphical user interface, in one embodiment, displays the top ten traffic classes relative to the selected utilization statistic (here, average rate) over the selected analysis interval (here, 1 hour). In addition, graphical user interface also includes category menus 72 facilitating the association of traffic class to a bandwidth control category.

FIGS. 4 and 4A provide methods facilitating configuration of bandwidth controls using graphical user interface of FIG. 5. When an administrator requests a configuration interface, administrator interface module 150, using a default utilization or other measured network statistic and analysis interval (see FIG. 4, step 302), displays the most significant traffic classes based on the utilization statistic (step 304). In one embodiment, administrator interface module 150 selects a first traffic class in measurement engine database 140 (see FIG. 4A, step 402) and computes a utilization statistic value for that traffic class (step 404). In one embodiment, administrator interface module 150 retrieves bandwidth utilization data associated with the traffic class and computes the utilization statistic over an analysis interval. Administrator interface module 150 repeats this process for all traffic classes in measurement engine database 140 (see steps 406 & 408). Administrator interface module 150 then orders the traffic classes according to the corresponding utilization statistic values (step 410) and displays the most significant traffic classes (step 412). In one embodiment, the most significant traffic classes comprise the first X (e.g., 8, 10, etc.) traffic classes in the ordered set. In another embodiment, the most significant traffic classes are those traffic classes having utilization statistic values exceeding a threshold value (e.g., consuming more than a threshold percentage of aggregate bandwidth over an analysis interval). As FIG. 5 illustrates, the graphical user interface displays the most significant traffic classes in descending order relative to the bandwidth utilization statistic. Depending on the bandwidth utilization statistic, however, the list may be arranged in ascending order.

As discussed below, the graphical user interface of FIG. 5 allows an administrator to add to the list of displayed traffic classes, change the utilization or network statistic about which the ordered list is computed, and/or apply bandwidth utilization controls to displayed traffic classes. For example, pull-down menu 62 allows a network administrator to selectively view the most significant traffic classes relative to bandwidth utilization statistics, including average rate, peak rate, total bytes, and other measurable network statistics, such as response time and network efficiency. When a network administrator selects a utilization statistic from pull-down menu 62 (see FIG. 306), client node composes a request for a new page, causing administrator interface 150 to display the most significant traffic classes based on the selected utilization statistic (see steps 308 and 304). Similarly, field 63 and pull-down menu 64 allow a network administrator to specify an analysis interval over which utilization statistics are computed (see steps 310 and 312). In addition, "add classes" button 68 allows a network administrator to manually add traffic classes to the traffic classes displayed by interface 60. In one embodiment, when a network administrator clicks "add classes" button 68 (step 314), administrator interface module 150 transmits a page including a list of selectable traffic classes (step 316). When the network administrator confirms a selection, administrator interface module 150 determines whether any traffic classes were selected (step 318) and, if so, displays the most significant traffic classes and the additional traffic classes specified by the administrator (steps 324 and 304). Lastly, a network administrator may use pull-down menus 72 and "apply" button 66 to associate a bandwidth control category to a displayed traffic class. In one embodiment, the graphical user interface of FIG. 5 allows a network administrator to select a predefined bandwidth control category or to configure a new bandwidth utilization control for the traffic class, such as a partition and/or a policy. In one embodiment, when network administrator clicks on "apply" button 66 (step 320), client node 42 transmits a request for an updated page, causing administrator interface module 150 to determine whether any changes to any bandwidth control categories have been made (step 322). If so, network administrator 150 applies the changes specified by the network administrator (step 328) and displays the revised configuration in an updated page-based interface. If no changes were made, then the selected interface is displayed (step 326) by the network administrator 150.

Accordingly, the graphical user interface of FIG. 5 automatically displays to the user those traffic classes whose configuration will most greatly influence operation of the network resource and allows a network administrator to concentrate on such traffic classes. A network administrator can access the graphical user interface of FIG. 5 and make desired changes to bandwidth utilization controls. Subsequently, the network administrator can return to the graphical user interface of FIG. 5 to observe the results of the configuration and make further desired changes. Effective bandwidth distribution configurations can be created for even very complex networks in minutes with just a few easy decisions. The administrator only pays attention to traffic using significant amounts of bandwidth and to critical traffic that is not shown. Depending on the configuration of bandwidth control categories, a decision to raise the importance of one traffic class reduces bandwidth allocated to less important traffic types, while a decision to inhibit a type of traffic increases the bandwidth available to more important traffic types.

Lastly, although the present invention has been described as operating in connection with end systems employing the TCP and IP protocols, the present invention has application in computer network environments employing any suitable transport layer and network layer protocols. Moreover, while the embodiments described above operate primarily to control utilization of bandwidth, the present invention can be applied to control utilization of a wide variety of network resources, such as a bank of modems, a pool of processors or wireless radio frequencies, a cluster of servers, or a group of BGP routing peers associated with a gateway router. Moreover, the present invention can be applied to almost any system requiring configuration, such as a router, or other network device. For example, the present invention can be applied to the configuration of network security policies, allowing a network administrator to concentrate on the most significant security issues. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating the configuration of parameters controlling utilization of a network resource, comprising the steps of:
   monitoring utilization of a network resource with respect to a plurality of utilization classes;
   displaying the most significant utilization classes based on a network statistic;
   facilitating association of a displayed utilization class with a network resource utilization control parameter operative to control utilization of the network resource, wherein facilitating association includes providing a user interface allowing for selection of a displayed utilization class and a desired network resource utilization control parameters; and
   wherein displaying the most significant utilization classes are further based on a minimum threshold percentage of the network resource.

2. The method of claim 1 further comprising the step of:
   facilitating selection of additional utilization classes not presented in the displaying step and association of control parameters to the additional utilization classes.

3. The method of claim 2 wherein the facilitating step comprises the steps of
   providing a user interface allowing for selection of a displayed utilization class and a desired control parameter; and
   wherein the user interface allows for selection of additional utilization classes and configuration of desired allocations of the network resource for selected additional utilization classes.

4. The method of claim 1 further comprising the step of upon selection by a user, associating a selected utilization class with control parameter selected by the user.

5. The method of claim 1 wherein the displaying step further comprises
   providing a user interface that displays the most significant utilization classes based on a utilization statistic;
   wherein the user interface allows for selection of a displayed utilization class and a desired control parameter.

6. The method of claim 5 wherein the user interface further allows for selection of additional utilization classes not presented in the displaying step and configuration of desired control parameters for selected additional utilization classes.

7. The method of claim 5 wherein the user interface displays the most significant utilization classes in an order relative to corresponding values of the network statistic.

8. The method of claim 5 wherein the user interface displays the most significant utilization classes in descending order relative to corresponding values of the network statistic.

9. The method of claim 5 wherein the user interface displays the most significant utilization classes in ascending order relative to corresponding values of the network statistic.

10. The method of claim 1 wherein the most significant utilization classes are displayed in an order relative to corresponding values of the network statistic.

11. The method of claim 1 wherein the most significant utilization classes are displayed in descending order relative to corresponding values of the network statistics.

12. The method of claim 1 wherein the most significant utilization classes are displayed in ascending order relative to corresponding values of the network statistic.

13. The method of claim 1 further comprising the steps of
providing a set of selectable network statistics;
receiving a selected utilization statistic from a user; and,
wherein the displaying step comprises
displaying the most significant utilization classes based on the selected network statistic.

14. The method of claim 1 wherein the network statistic is a utilization statistic.

15. The method of claim 1 wherein the network statistic is computed over a given analysis interval; and wherein the method further comprises the steps of:
allowing for selection of an analysis interval.

16. The method of claim 1 wherein the facilitating step comprises the steps of
providing a user interface allowing for selection of a displayed utilization class and a desired parameter.

17. The method of claim 16 wherein the network statistic is a utilization statistic.

18. The method of claim 1 wherein the control parameter is one of a plurality of control parameters, and wherein the plurality of control parameters are hierarchically inter-related such that changing the control parameter of the displayed utilization class to a higher-ranked or a lower-ranked control parameter causes a corresponding increase or decrease of priority for the network resource.

19. A method facilitating the configuration of bandwidth management parameters, comprising the steps of:
monitoring bandwidth utilization with respect to a plurality of traffic classes;
displaying the most significant traffic classes based on a network statistic;
facilitating association of a displayed traffic class with a bandwidth utilization control parameter operative to control the bandwidth utilization, wherein facilitating association includes providing a user interface allowing for selection of a displayed bandwidth class and a desired bandwidth utilization control parameter; and
wherein displaying the most significant traffic classes are further based on a minimum threshold percentage of the bandwidth utilization.

20. The method of claim 19 further comprising the step of:
facilitating selection of additional traffic classes not presented in the displaying step and association of bandwidth utilization controls to the additional traffic classes.

21. The method of claim 19 wherein each bandwidth control category maps to a set of bandwidth utilization controls.

22. The method of claim 19 wherein the bandwidth utilization control is implemented by an aggregate data flow bandwidth utilization control.

23. The method of claim 19 wherein the bandwidth utilization control is implemented by a per-flow bandwidth utilization control.

24. The method of claim 19 wherein the bandwidth utilization control is implemented by at least one aggregate data flow bandwidth utilization control and at least one per-flow bandwidth utilization control.

25. The method of claim 19 wherein the monitoring step further comprises the step of
automatically creating new traffic classes in response to data flows.

26. The method of claim 19 wherein the network statistic is computed over a given analysis interval; and wherein the method further comprises the steps of:
allowing for selection of an analysis interval.

27. The method of claim 19 wherein the bandwidth utilization control is one of a plurality of bandwidth utilization controls, and wherein the plurality of bandwidth utilization controls are hierarchically inter-related such that changing the bandwidth utilization control of the displayed traffic class to a higher-ranked or a lower-ranked bandwidth utilization control causes a corresponding increase or decrease of priority for the bandwidth utilization.

28. An apparatus allowing for the management of bandwidth utilization across an access link, comprising:
a traffic discovery engine operative to identify traffic classes corresponding to data flows traversing an access link; wherein the traffic discovery engine is further operative to measure bandwidth utilization across the access link with respect to a plurality of traffic classes in relation to at least one bandwidth utilization statistic;
a bandwidth control mechanism operative to enforce bandwidth utilization controls on data flows associated with corresponding traffic classes; and
a user interface module operative to display the most significant traffic classes based on a bandwidth utilization statistic; and wherein the user interface module facilitates association of a bandwidth utilization control parameter to a selected traffic class wherein the bandwidth utilization control parameter is operative to control the bandwidth utilization; and wherein display of the most significant traffic classes are further based on a minimum threshold percentage of the bandwidth utilization.

29. The apparatus of claim 28 wherein the bandwidth utilization statistic is selectable by a user.

30. The apparatus of claim 28 wherein the bandwidth utilization statistic is computed over an analysis interval.

31. The apparatus of claim 30 wherein the analysis interval is selectable by a user.

32. The apparatus of claim 28 wherein the traffic discovery engine is further operative to create new traffic classes in response to data flows.

33. The apparatus of claim 28 wherein the user interface allows for the display of additional traffic classes.

34. The apparatus of claim 28 wherein the bandwidth utilization control is one of a plurality of bandwidth utilization controls, and wherein the plurality of bandwidth utilization controls are hierarchically inter-related such that changing the bandwidth utilization control of the selected traffic class to a higher-ranked or a lower-ranked bandwidth utilization control causes a corresponding increase or decrease of priority for the bandwidth utilization.

* * * * *